(12) United States Patent
Chen et al.

(10) Patent No.: US 7,920,070 B2
(45) Date of Patent: Apr. 5, 2011

(54) PARKING GUIDANCE DEVICE AND METHOD THEREOF

(75) Inventors: Long-Tai Chen, Miaoli County (TW);
Yen-Shu Chang, Taoyuan County (TW);
Wei-Min Li, Kaohsiung County (TW);
Kuo-Hsiang Cheng, Taipei County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 285 days.

(21) Appl. No.: 12/265,866

(22) Filed: Nov. 6, 2008

(65) Prior Publication Data
US 2009/0167564 A1 Jul. 2, 2009

(30) Foreign Application Priority Data
Dec. 27, 2007 (TW) .............................. 96150486 A (51) Int. Cl.
*B60Q 1/48* (2006.01)
(52) U.S. Cl. .............. 340/932.2; 340/435; 340/436; 340/937; 348/148
(58) Field of Classification Search ............. 340/932.2, 340/435, 937; 348/118, 148; 701/300, 301
See application file for complete search history.

(56) References Cited

U.S. PATENT DOCUMENTS

| | | | | |
|---|---|---|---|---|
| 6,828,903 B2 * | 12/2004 | Watanabe et al. | ............. | 340/435 |
| 7,053,795 B2 * | 5/2006 | Maemura et al. | .......... | 340/932.2 |
| 7,640,108 B2 * | 12/2009 | Shimizu et al. | ............... | 701/301 |
| 7,737,866 B2 * | 6/2010 | Wu et al. | ..................... | 340/932.2 |
| 7,739,046 B2 * | 6/2010 | Satonaka et al. | ............. | 701/300 |
| 2006/0139181 A1 * | 6/2006 | Danz et al. | ................. | 340/932.2 |

FOREIGN PATENT DOCUMENTS

| | | |
|---|---|---|
| CN | 1975331 A | 6/2007 |
| TW | I229645 | 1/2005 |
| TW | 200722311 | 6/2007 |

* cited by examiner

*Primary Examiner* — Davetta W Goins
(74) *Attorney, Agent, or Firm* — WPAT, PC; Justin King (57) ABSTRACT

A parking guidance device storing the information of length and width of a car is disclosed, which comprises: a central controller, a distance detector electrically connecting to said central controller for detecting the distances from obstacles, an image detector electrically connecting to said central controller for detecting the shape of a parking space, a two-axis rotating detector electrically connecting to said central controller for detecting the direction of said car, a human-machine operation interface electrically connecting to said central controller for inputting signals, and a car controller area network bus interface electrically connecting to said central controller for controlling wheel, engine and braking system, wherein said central controller integrates the information of distances and shape of said parking space, compares the same to the information of length and width of said car to gain a parking track, and makes the moving track of said car correspond with said parking track by controlling wheel, engine and braking system through the car controller area network bus interface.

24 Claims, 6 Drawing Sheets

PARKING GUIDANCE DEVICE AND METHOD THEREOF

FIELD OF THE INVENTION

The present invention relates to a parking guidance device and method thereof, and more particularly, to a parking device capable of incorporating information detected from different types of detectors to be used for guiding a car to park into a parking space.

BACKGROUND OF THE INVENTION

Driving is a skill that requires your full attention to safely control your vehicle and respond to events happening on the roads around you. Drivers who are distracted or tired can be dangerous not only to the safety of themselves, but also to others on the road, since they are often the cause of severe traffic accidents resulting in human life and property losses. Therefore, there are more and more electronic safety devices being developed and applied in automobiles that are to be used for assisting drivers to drive safely.

Due to their inexperience in wheel steering, obstacle observation and avoidance, parking trajectory estimation and parking space determination, parking can be in general one of the most troublesome problems for those novices and unskilled drivers. It is common for they to make mistakes during parking and that may sometimes leads to real damage and costly repair. Nevertheless, even for those most experienced drivers, trying to park a car into a parking space at an unfamiliar location may be a stressful job. Overall, parking is a critical test for driver's driving skill, especially in a crowded urban area. In addition to the ability for judging whether or not the size of the space is appropriate for the car, it is not until a driver is able to master the skill of wheel steering and also have experience in vehicle dynamic control response that he/she can park a car properly. Those who are not experienced may steer the wheel back and forth for as many times as possible and still can not perform a parking operation correctly.

From the above description, it is known that parking is a task of a high degree of difficulty that not only a driver should have good eyesight and keen observation with regard to parking space evaluation and obstacle avoidance, he also should be able to plan a good parking trajectory while steering. In general, there are three key actions must be performed well in a parking operation, which are:
(1) parking space evaluation;
(2) blind spot and obstacle determination; and
(3) relationship between the sequence of the steering wheel control and the result vehicle dynamic control response.

Thus, to park a car will require its driver to perform a sequence of actions of perception, decision and motion control. Consequently, to enhance the driver's perception, to perfect the driver's decision and to assist the driver's motion control for reducing invalid operation in steering are the three key issues when it comes design a good parking assistant system. According to a poll released by Japan Automobile Federation, a significant number of common Japanese drivers have a negative impression of parallel and garage parking, which are usually to be ranked in the top-three most troublesome problems in parking.

In response, a wide range of different parking-support systems have been developed. One of which is a parking assistant device, disclosed in TW Pat. No. I229645, which includes: an imaging unit; a monitor arranged at a location near the driver seat of a car; a yawing angle inspection unit; a guidance unit; and a controller. The driver using the aforesaid parking assistant device is able to park a car into a target parking space according to the guidance information provided by the device. However, the aforesaid parking assistant device is disadvantageous in that: it can not automatically judging whether or not the size of the space is appropriate for the car; it only is able to perform an ambient environment perception operation by the detection of its imaging unit; and manual control is still required as when the car is being park and is in reverse, the device will only display parking information such as parking assistance lines on its monitor without providing automatic steering assistance.

Therefore, it is in need of a parking guidance device for a car, capable of using the detection of its image detector and distance detector to obtain a parking information and thus generate a parking track accordingly while directing the car to move autonomously in a moving track conforming to the parking track by controlling the wheel, engine and braking system of the car.

SUMMARY OF THE INVENTION

The object of the present invention is to provide a parking guidance device, capable of incorporating information detected from different types of detectors to be used for guiding a car to park into a parking space by controlling the wheel, engine and braking system of the car.

To achieve the above object, the present invention provides a parking guidance device, storing the information of length and width of a car, comprising:
  a central controller;
  a distance detector, electrically connecting to said central controller for detecting distances between obstacles surrounding the car;
  an image detector, electrically connecting to the central controller for detecting the shape of a parking space;
  a two-axis rotating detector, electrically connecting to the central controller for detecting information relating to the locality of the car;
  a human-machine operation interface, electrically connecting to the central controller for inputting signals; and
  a car controller area network bus interface, electrically connecting to the central controller for controlling the wheel, engine and braking system of the car;
  wherein, the central controller integrates the information of distances and shape of the parking space while comparing the integrated information with the information of length and width of the car as well as it locality information so as to gain a parking track, and then directs the car to move in a moving track conforming to the parking track by controlling the wheel, engine and braking system through the car controller area network bus interface.

To achieve the above object, the present invention further provides a parking guidance method, comprising the steps of:
  (a) providing a parking guidance device, being comprised of a central control, a distance detector, an image detector, a two-axis rotating detector, a human-machine operation interface, and a car controller area network bus interface, being electrically connected to the central control in respective;
  (b) activating the parking guidance device for enabling the two-axis rotating detector to acquire information relating to the locality of a car;
  (c) using an image detector to detect images from the two lateral sides of the car while using a distance detector to detect distances measured between obstacles located at the two lateral sides of the car;

(d) enabling a central controller to make an evaluation by the use of the obtained images for determining whether there is a parking space available for parking; if so, the flow proceeds to step (e); otherwise, the flow proceeds back to step (c);

(e) enabling the central controller to make an evaluation for determining whether the size of the available parking space is larger than that of the car; if so, the flow proceeds to step (f); otherwise, the flow proceeds to step (c);

(f) enabling the central controller to generate a relative position information between the car and the parking space according to the distances measured between obstacles surrounding the car and the locality information of the car;

(g) enabling the central controller to perform a calculation for gaining a parking track according to the relative position information; and (h) enabling the central controller to direct the car to move in a moving track conforming to the parking track by controlling the wheel, engine and braking system through the car controller area network bus interface.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
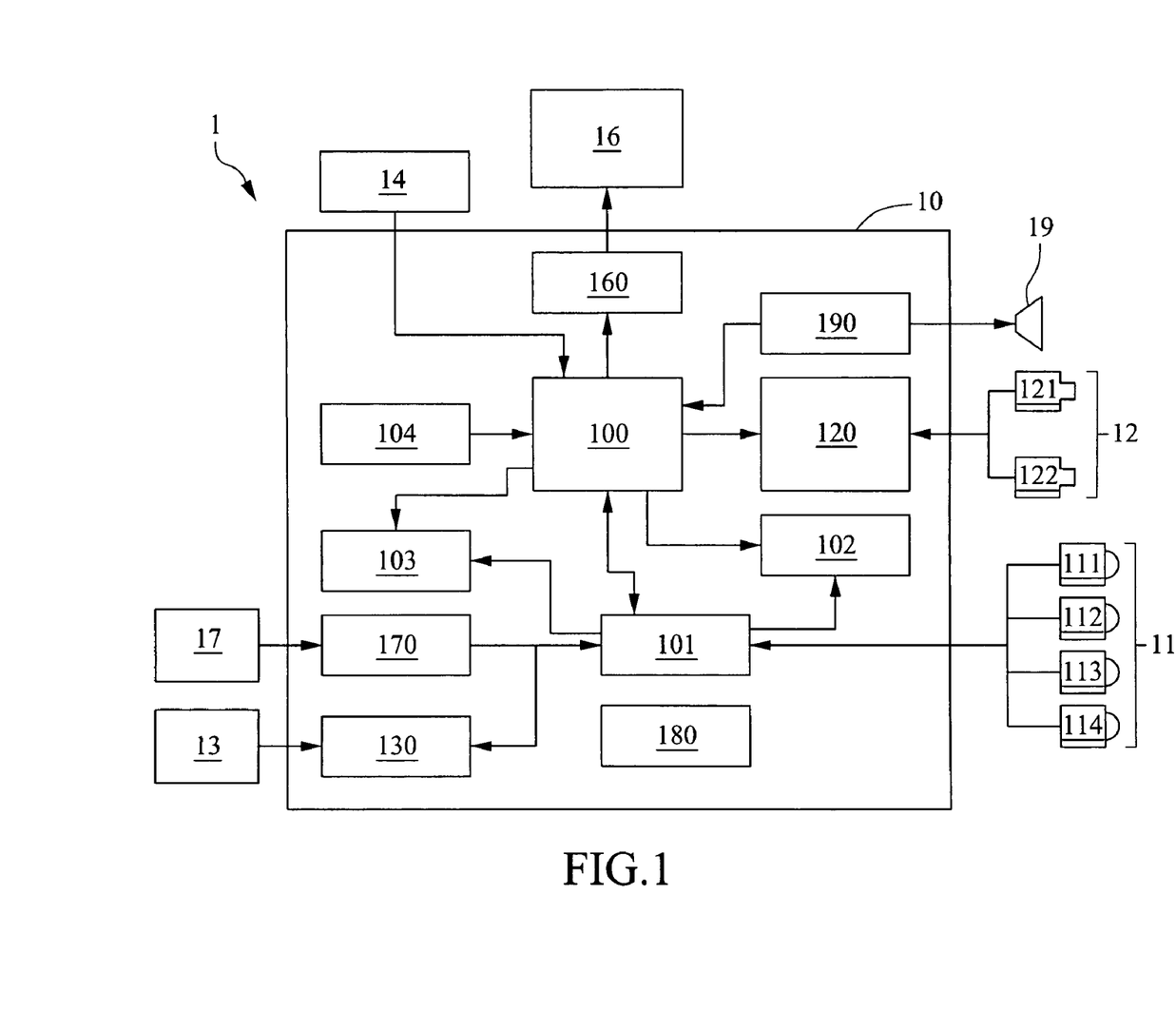
FIG. 1 is a block diagram showing a parking guidance device according to an exemplary embodiment of the invention.

Please refer to FIG. 1, which is a block diagram showing a parking guidance device according to an exemplary embodiment of the invention. In FIG. 1, the parking guidance device 1 comprises: a central controller 10, a distance detector 11, an image detector 12, a human-machine operation interface 14, a displaying unit 16 and an alarm unit 19, in which the central controller 10 further comprises: a main calculation unit 100, auxiliary calculation unit 101, a flash memory 102, a dynamic random access memory (DRAM) 103, a gyroscope 104, an image processor 120, a car controller area network bus interface 130, a 2D/3D image accelerator 160, a vehicle signal processing interface 170, a power source 180, and an audio decoder 190.

The main calculation unit 100 is used for controlling the image detector 12 with regard to the performing of image processing, image identification, and data fusion upon the images acquired thereby, and for managing a car controller area network 130, for controlling a system flow of the parking guidance device, for controlling the processing of the human-machine operation interface 14, and the controlling of the signal outputting of the alarm unit 19; and the auxiliary calculation unit 101 is used for controlling the operation of the distance detector 11 and a vehicle signal processing interface 170.

In this exemplary embodiment, the distance detector 11 is used for detecting distances between obstacles surrounding the car, which includes four sets of distance sensors 111, 112, 113, 114 while arranging two of the four sets at the left side of the car and the other two sets at the left side of the car, i.e. mounting the distance sensor sets 111 and 112 respectively on the left corner of the car's front bumper and the left corner of the car's rear bumper while mounting the distance sensor sets 113 and 114 respectively on the right corner of the car's front bumper and the right corner of the car's rear bumper. The image detector 13 is used for detecting the shape of a parking space, which includes two sets of image sensors 121, 122 to be arranged respectively at the left and the right sides of the car. In this embodiment, the two image sensor sets 121, 122 are mounted respectively on the right rear-view mirror and the left rear-view mirror. Moreover, the distance sensor sets 111, 112, 113, 114 are electrically connected to the auxiliary calculation unit 101 and the two image sensor sets 121, 122 are electrically connected to the main calculation unit 100.

The central controller 10 has information relating to the length and width of the car to be stored therein, e.g. such information can be stored in the DRAM 103. The gyroscope 104, being electrically connected to the central controller 10, is used for detecting information relating to the locality of the car. For instance, the gyroscope 104 is designed to detect the turning angle of the car while transmitting the angle detection back to the central controller 10. The parking guidance device 1 employs the car controller area network bus interface 130 to establish an electric connection with the wheel, engine and braking system 13 of the car, and thereby, enables the central controller 10 to control the wheel, engine and braking system 13 of the car. In addition, the vehicle signal processing interface 170 is used for detecting a signal relating to the movement of the car, a signal relating to the ignition of the car, a signal relating to the turn signal lamps of the car, a signal relating to the braking lamps of the car, a speed signal of the car, and a braking signal of the car; and the human-machine operation interface 14 is provided to a driver of the car for enabling the same to input commands to the parking guidance device, such as parameter configuration, activation, deactivation.

The flash memory 102 and the DRAM 103 are memories embedded in the central controller 10 for registering temporary data relating to the operation of the central controller 10. The power supply 180 is used for providing power to the parking guidance device 1.

As shown in FIG. 1, the alarm unit 19 and the display unit 16 are all electrically connected to the central controller 10. In this embodiment, the alarm unit 19 is connected to the main calculation unit 100 through an audio decoder 190 that it can issue a warning signal for alerting the driver about the status and abnormalities of the car. For instance, the alarm unit 190 can issue a vocal signal or a lighting signal for reminding the driver that the car is in reverse, in cruise or the water/oil temperature is above normal, and so on. Moreover, the display unit 16 is electrically connected to the main calculation unit 100 through the 2D/3D image accelerator 160, which is used for displaying information relating to the images surrounding the car, the locality of the car in a real time manner.

From the above description, it is noted that the central controller 10 is configured with abilities of image processing, image identification, distance evaluation, space scan calculation, parking space determination, parking trajectory calculation, rudder angle switching for steering wheel and 2D image processing, and so on, not to mention that it is designed to provide an external control signal to the engine controller and the braking system of the car. The central controller is able to detect a parking space by the use of the distance detector 11 and the image detector 12 while performing an evaluation for determining whether the detected parking space is large enough for the car to park by using the information also provided from the distance detector 11 and the image detector, including the aspect ratio of the detected parking space, the types of the obstacles existed in the detected parking space as well as the distance measured between those obstacles as such information is compared with the information relating to the length and width of the car that is stored in the parking guidance device 1 and the predefined buffering distance programmed in the parking guidance device 1 by the driver through the human-machine operation interface 14. In addition, the central controller 10 is able to obtain signal from a steering angle sensor through the vehicle signal processing interface 170 while basing upon the signal to determine the truing angle of the car's wheel. Thereafter, the central controller will perform a calculation to obtaining a parking trajectory basing upon the wheel's turning angle and the Ackerman theory. Then, the central controller 10 will base on the current reversing speed of the car to issue a recommendation relating the angle of steering which is provided to the driver by graphics and characters displayed on the display unit 16, or the central controller 10 will perform an autonomous control upon the wheel, engine and braking system 13 through the car controller area network bus interface 130 for directing the car to move in a moving track conforming to the parking track so as to park the car in an automatic manner.

Figure 2:
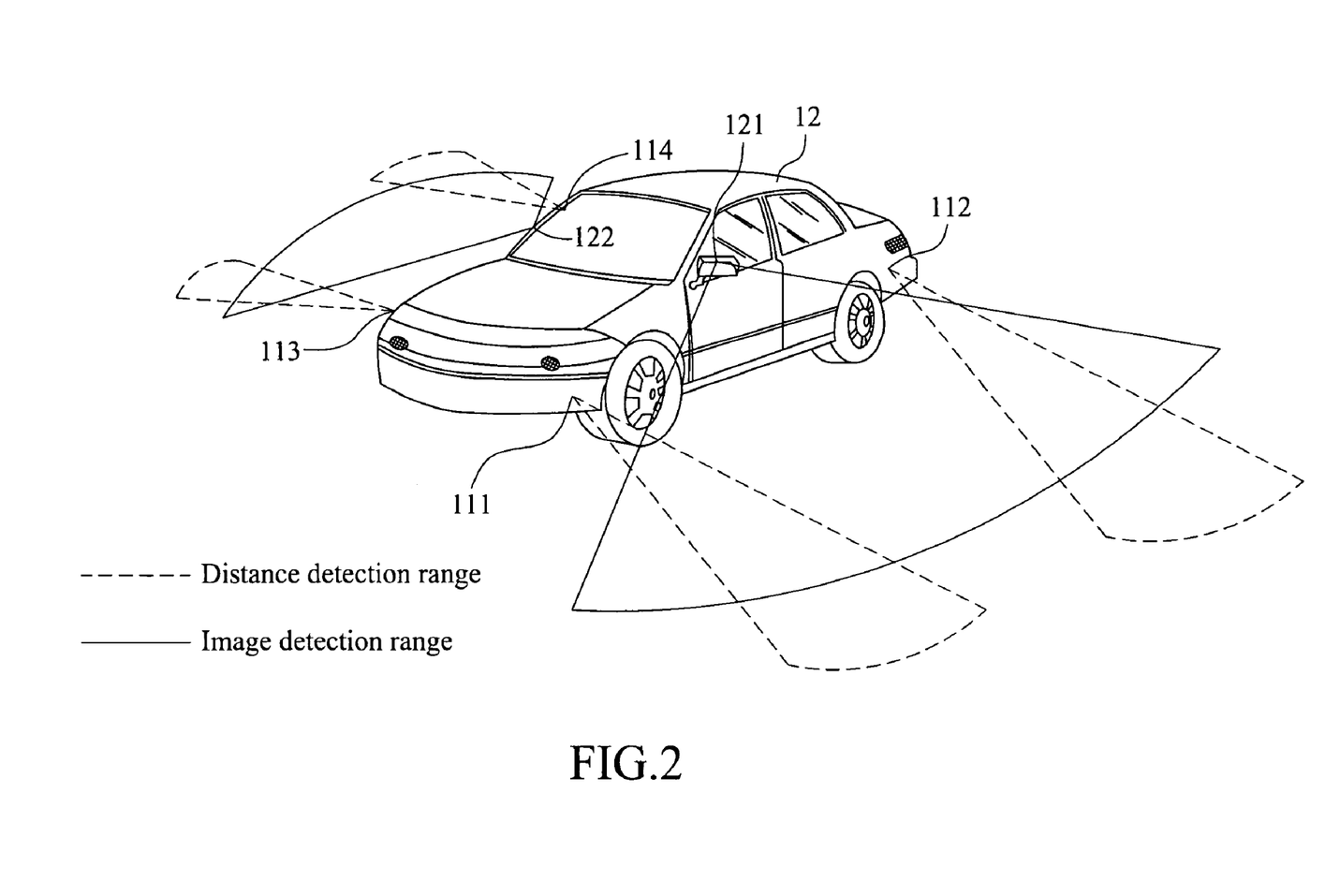
FIG. 2 is a pictorial diagram showing a parking guidance device of the invention as it is being mounted on a car.
Figure 3:
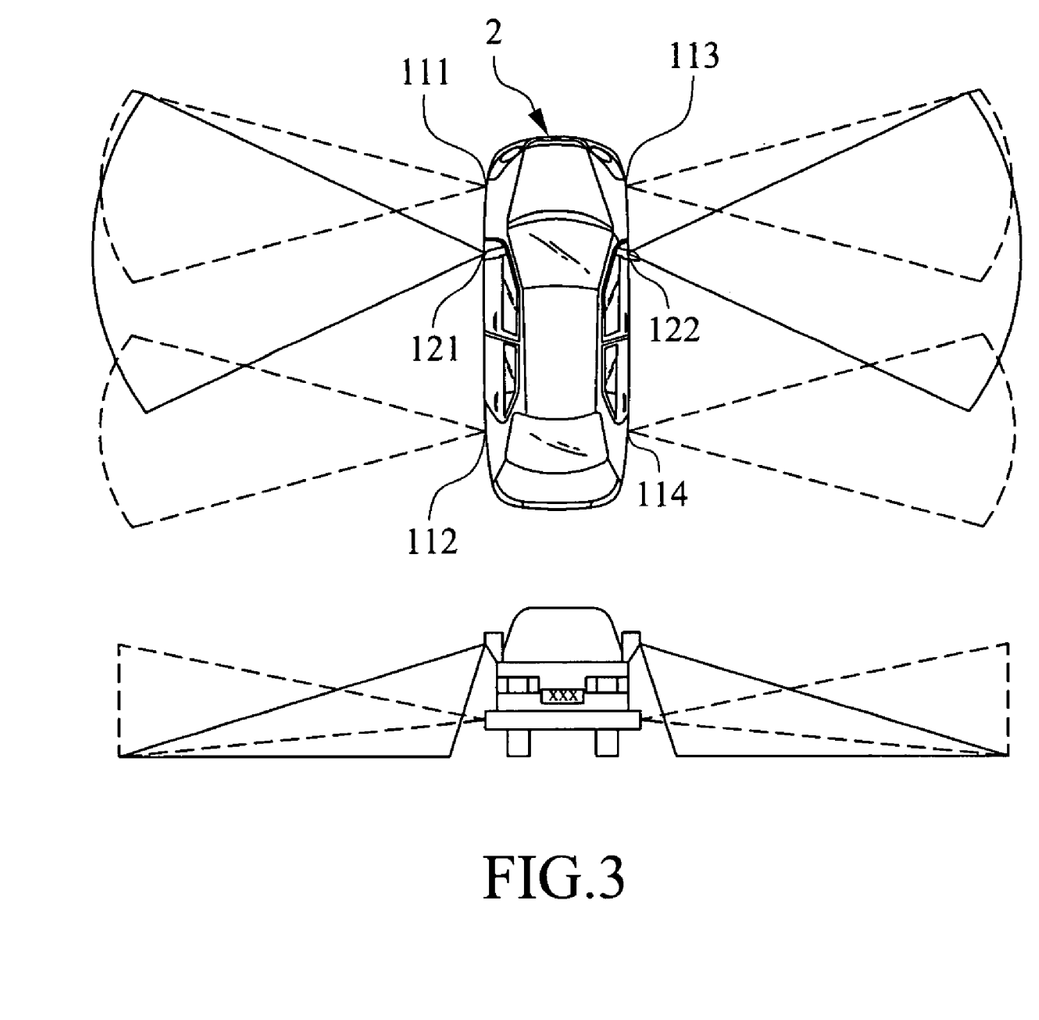
FIG. 3 shows a top view and a side view of a parking guidance device of the invention as it is being mounted on a car.

Please refer to FIG. 2 and FIG. 3, which show a parking guidance device of the invention as it is being mounted on a car 2. In this embodiment, the distance sensor sets 111 and 112 are mounted respectively on the left corner of the car's front bumper and the left corner of the car's rear bumper while the distance sensor sets 113 and 114 are mounted respectively on the right corner of the car's front bumper and the right corner of the car's rear bumper, that the four distance sensor sets are used for detecting distances between obstacles surrounding the car 2. In addition, the detection frequency and the detection range of each set can be configured as following: side scan frequency to be more than twenty time per second; detection distance range to be between 0.3 meter to 6 meters; resolution to be between 15 cm to 20 cm; level scanning angle to be 30 degrees. As for the image detector 12, it include two sets of image sensors 121, 122 which are arranged respectively at the left and the right rear view mirrors of the car 2 to be used for locality identification and determination; and each is configured for acquiring images surrounding the two sides of the car 2 within 0.3 meter to 6 meter by a 60 degrees of depression in a processing frequency of 10 to 15 frames per second while outputting the same by 15 frames per second in a real time manner. It is noted that the aforesaid configurations for the distance detector 11 and the image detector 12 are only for illustration and thus are not limited thereby. The side images of the car is send to the central controller 10 where they are evaluated for determining whether there is a parking space available; if so, the information obtained from the side images is integrated with information from the distance detector 11 to be used for determining whether the parking space is larger enough for the car 2 to park while displaying the determination on the display unit 16. If the parking space is determined to be large enough, the central controller 10 will perform a calculation to generate a parking trajectory and the consequent recommended steering angles which are displayed on the display unit 16 as parking recommendation for the driver of the car 2.

Figure 4A:
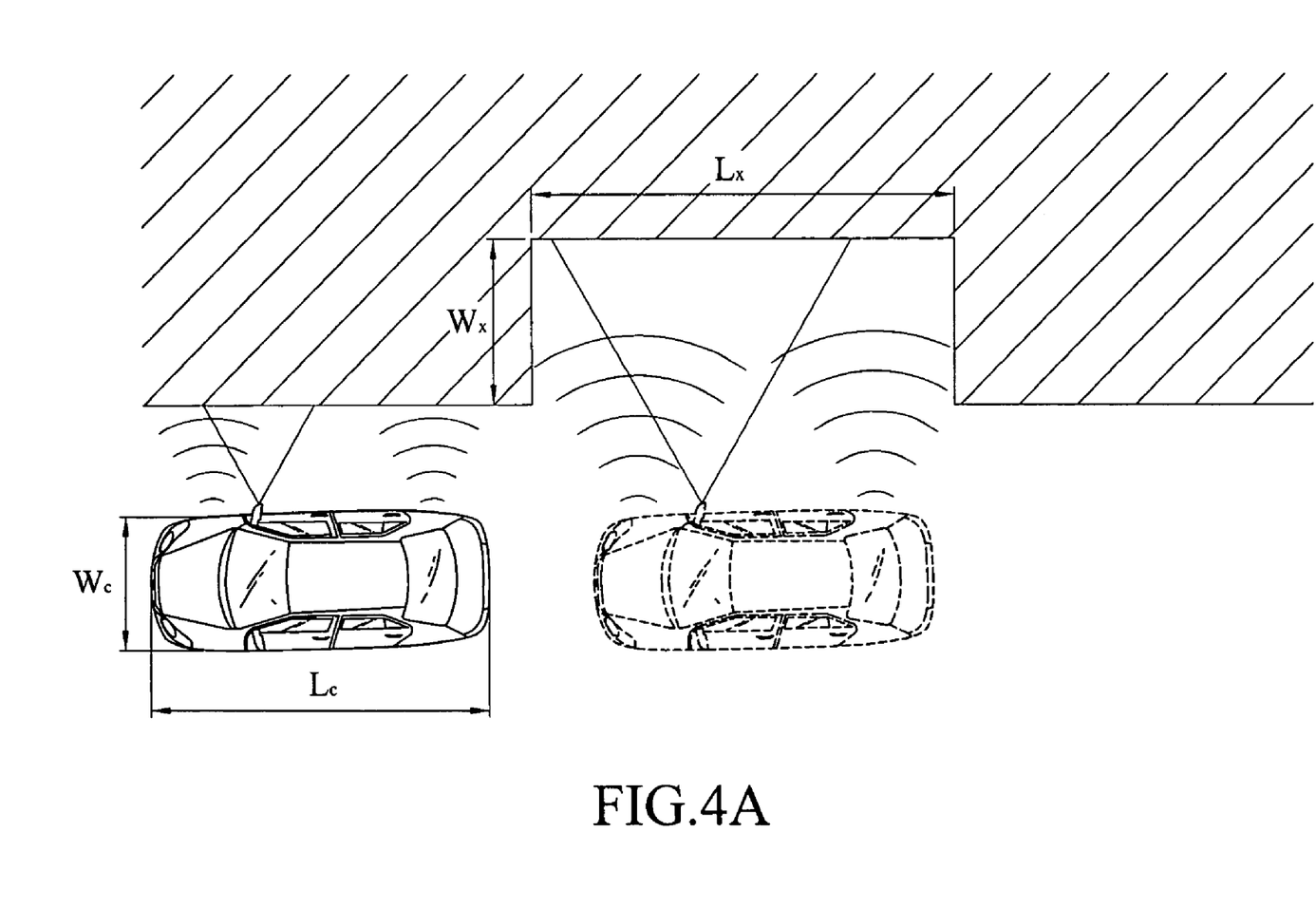
FIG. 4A shows the operation of a parking guidance device for directing a car to perform a parallel parking.
Figure 4B:
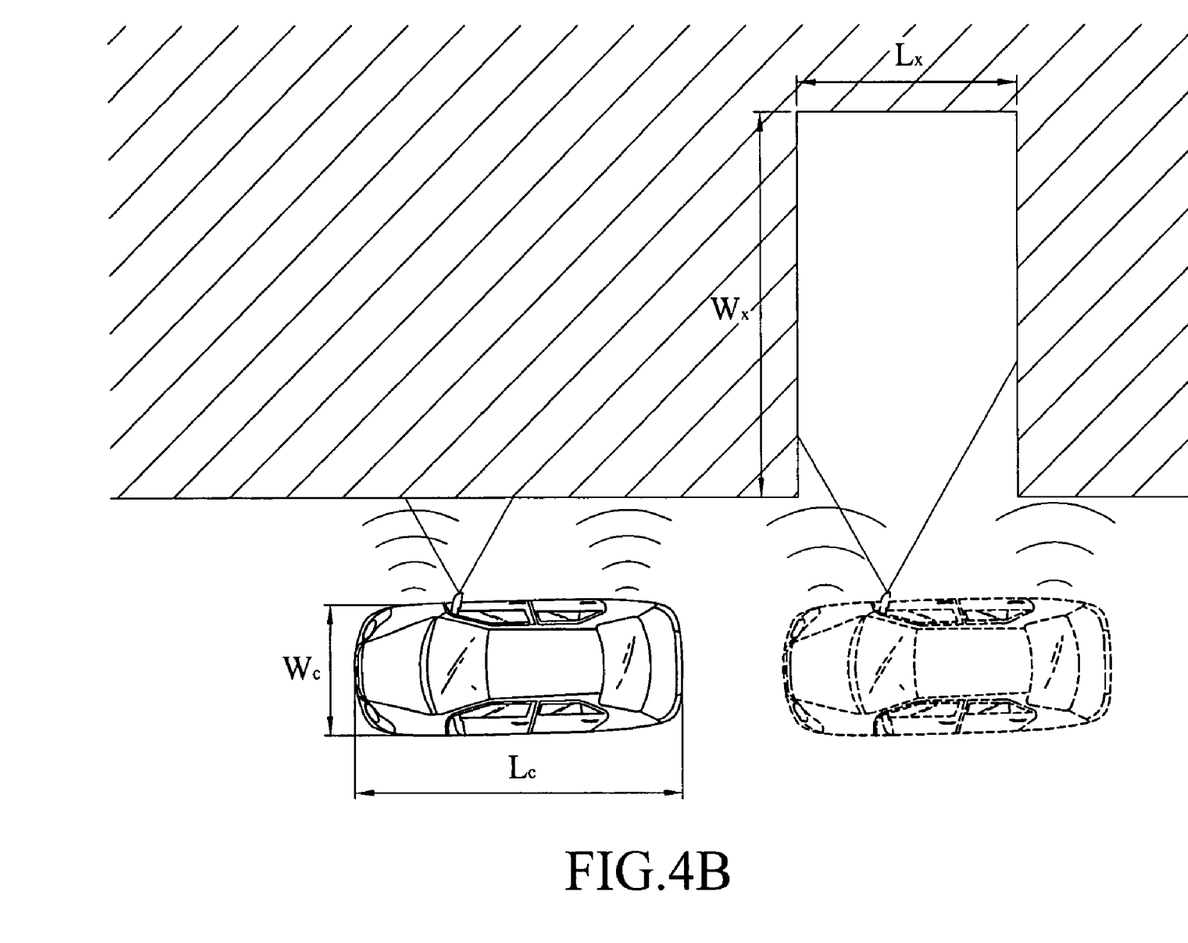
FIG. 4B shows another operation of a parking guidance device for directing a car to perform a garage parking.
Figure 5:
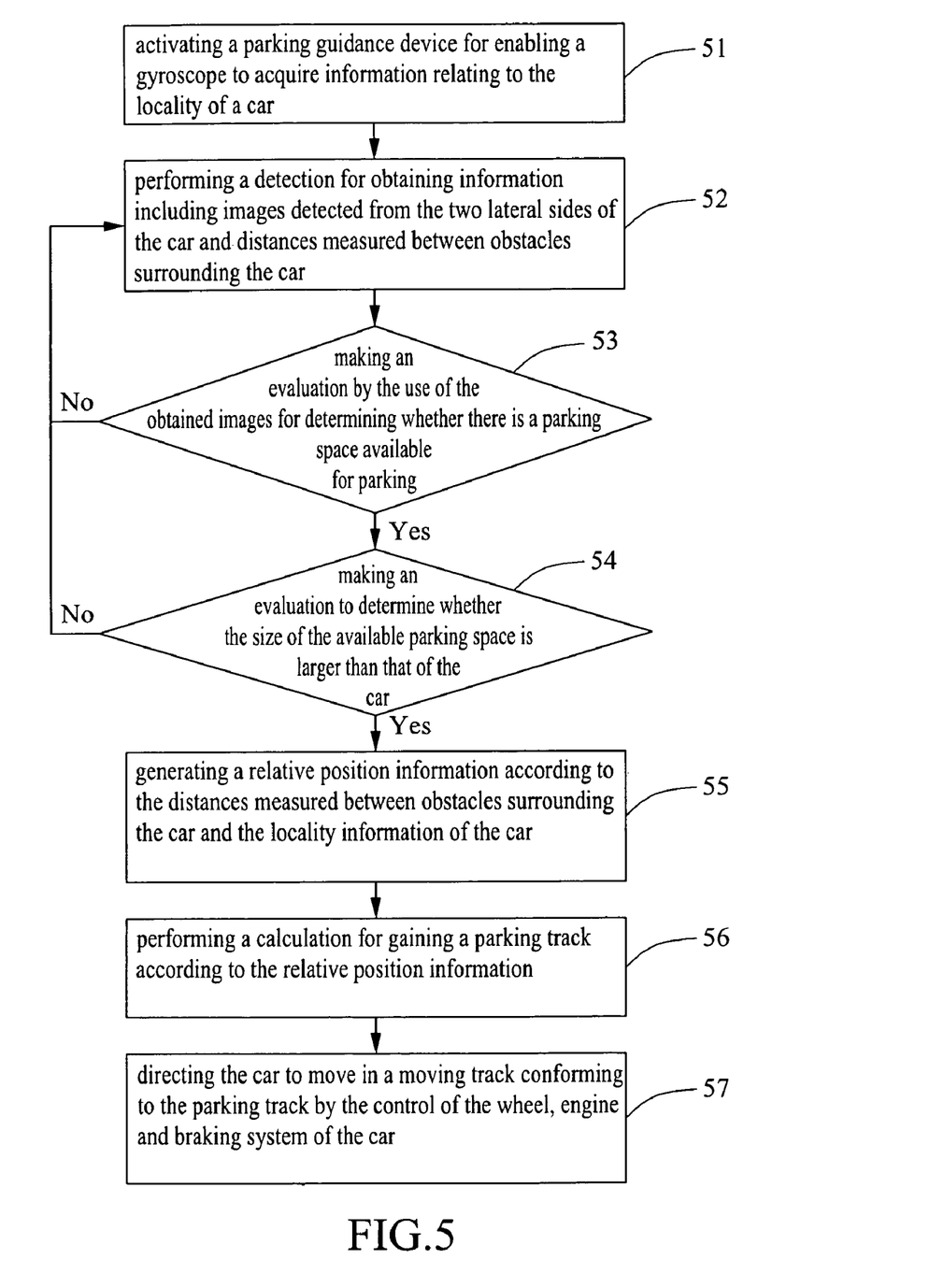
FIG. 5 is a flow chart depicting the steps of a parking guidance method of the invention.

Please refer to FIG. 4A and FIG. 4B, which show the operations of a parking guidance device for directing a car to perform a parallel parking and a garage parking. The parameters specified in FIG. 4A and FIG. 5 are as following: the car length is $L_C$; the car width is $W_C$; the parking distance at the lateral side of a car is α which is a distance larger enough for the car doors to open; the buffering distance at the lateral side of a car is β; the buffering distance relating to the length of the car is γ; and the length of a detected parking space is Lx and the width thereof is $W_X$.

Accordingly, if the detected length $L_X$ and the width $W_X$ satisfy the following conditions:

$$L_C + \gamma \leq L_X \text{ and } W_C + \alpha + \beta \leq W_X \leq L_C + \gamma$$

The parking guidance device will determine that the detected parking space is suitable for parallel parking, and thereafter, as soon as the locality relationship information between the car and the parking space is obtained by its distance detector, the parking guidance device is able to perform a calculation according to the wheel's turning angle and the Ackerman theory to generate a parking trajectory for directing the car to perform a parallel parking operation, as shown in FIG. 4A.

On the other hand, if the detected length $L_X$ and the width $W_X$ satisfy the following conditions:

$$L_C + \gamma \leq W_X \text{ and } W_C + \alpha + \beta \leq L_X \leq L_C + \gamma$$

The parking guidance device will determine that the detected parking space is suitable for garage parking, and thereafter, as soon as the locality relationship information between the car and the parking space is obtained by its distance detector, the parking guidance device is able to perform a calculation according to the wheel's turning angle and the Ackerman theory to generate a parking trajectory for directing the car to perform a garage parking operation, as shown in FIG. 4B.

Please refer to FIG. 5, which is a flow chart depicting the steps of a parking guidance method of the invention. The parking guidance method 5, being programmed in the aforesaid parking guidance device, comprises the following steps:

Step 51: activating the parking guidance device for enabling the gyroscope to acquire information relating to the locality of the car;

Step 52: using the image detector to detect images from the two lateral sides of the car while using the distance detector to detect distances measured between obstacles located at the two lateral sides of the car;

Step 53: enabling the central controller to make an evaluation by the use of the obtained images for determining whether there is a parking space available for parking; if so, the flow proceeds to step (54); otherwise, the flow proceeds back to step (52);

Step 54: enabling the central controller to make an evaluation for determining whether the size of the available parking space is larger than that of the car, including the buffering distances; if so, the flow proceeds to step (55); otherwise, the flow proceeds to step (52);

Step 55: enabling the central controller to generate a relative position information between the car and the parking space according to the distances measured between obstacles surrounding the car and the locality information of the car;

Step 56: enabling the central controller to perform a calculation for gaining a parking track according to the relative position information; and Step 57: enabling the central controller to direct the car to move in a moving track conforming to the parking track by controlling the wheel, engine and braking system through the car controller area network bus interface.

In an exemplary embodiment, the central controller of the parking guidance device is configured with a DRAM of more than 32 MB and a flash memory of more than 16 MB, but is only used as illustration and is not limited thereby since the size of such memories in the parking guidance device of the invention can be determined according to the type and requirement of the car on which it is being mounted. Moreover, the parking guidance device of the invention can be configured according to actual requirements. For instance, it can be set up in a manner that it is activated when the car'speed is lower than 40 kilometers per hour, but only is enabled to perform a detection for measuring distances between obstacles surrounding the car and not perform the relating parking space evaluation at the speed around the 40 kilometers per hour so that it can be used as a blind spot detection device as the car is cruising at low speed; and, as soon as the speed in lower than 10 kilometers per hour, the operation of parking space evaluation is activated.

In general, the parking guidance device uses its image detector and distance detector to scan and detect available parking space, and as soon as a parking space is detected, it can calculate the relative locality between the parking space and the car so as to generate a parking trajectory along with the consequent steering recommendation to the driver or simply control the car to move automatically through the control of its engine, braking system and steer wheel for parking the same into the parking space. By the lateral detection of the aforesaid parking guidance device, any available parking space can be detected automatically without any effort from the driver. In addition, the driver will no longer be troubled by the steering complexity for parking a car as the parking guidance device can generate a parking trajectory for directing the car to park. Moreover, as the parking guidance device can provide graphic information relating to parking to the driver in a dynamic and real time manner, not to mention it can also guide the car to park automatically, parking can be a simple task for any driver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parking guidance device, adapted for mounted on a car to be used as parking assistant while having information relating to the length and width of the car to be stored therein, comprising:

a central controller;

a distance detector, electrically connecting to said central controller for detecting distances between obstacles surrounding the car;

an image detector, electrically connecting to the central controller for detecting the shape of a parking space;

a two-axis rotating detector, electrically connecting to the central controller for detecting information relating to the locality of the car;

a human-machine operation interface, electrically connecting to the central controller for inputting signals; and a car controller area network bus interface, electrically connecting to the central controller for controlling the wheel, engine and braking system of the car;

wherein, the central controller integrates the information of distances and shape of the parking space while comparing the integrated information with the information of length and width of the car as well as it locality information so as to gain a parking track, and then directs the car to move in a moving track conforming to the parking track by controlling the wheel, engine and braking system through the car controller area network bus interface;

wherein the car length is $L_C$ the car width is $W_C$ the parking distance at the lateral side of a car is $\alpha$ which is a distance large enough for the car doors to open, the buffering distance at the lateral side of a car is $\beta$, the buffering distance relating to the length of the car is $\gamma$ and the length of a detected parking space is $L_X$ and the width thereof is $W_X$;

wherein if the detected length $L_X$ and the width $W_X$ satisfy the following conditions:

$L_C+\gamma \leq L_X$ and $W_C+\alpha+\beta \leq W_X \leq L_C+\gamma$, the parking guidance device determines that the detected parking space is suitable for parallel parking, as soon as the locality relationship information between the car and the parking space is obtained by its distance detector, the parking guidance device is able to perform a calculation according to the wheel's turning angle and the Ackerman theory to generate a parking trajectory for directing the car to perform a parallel parking operation; and if the detected length $L_X$ and the width $W_X$ satisfy the following conditions:

$L_C+\gamma \leq W_X$ and $W_C+\alpha+\beta \leq L_X \leq L_C+\gamma$, the parking guidance device determines that the detected parking space is suitable for garage parking, as soon as the locality relationship information between the car and the parking space is obtained by its distance detector, the parking guidance device is able to perform a calculation according to the wheel's turning angle and the Ackerman theory to generate a parking trajectory for directing the car to perform a garage parking operation.

2. The parking guidance device of claim 1, further comprising:

a display unit, electrically connecting to the central controller.

3. The parking guidance device of claim 2, wherein the display unit is enabled to display the information relating to the distances between obstacles, the shape of the parking space and the locality of the car.

4. The parking guidance device of claim 2, wherein the display unit is enabled to display in a real time manner.

5. The parking guidance device of claim 1, further comprising:

a vehicle signal processing interface, electrically connecting to the central controller for detecting a signal relating to the movement of the car, a signal relating to the ignition of the car, a signal relating to the turn signal lamps of the car, a signal relating to the braking lamps of the car, a speed signal of the car, and a braking signal of the car.

6. The parking guidance device of claim 1, further comprising:
an alarm unit, electrically connecting to the central controller.

7. The parking guidance device of claim 6, wherein the alarm unit is enabled to issue a sound for alerting.

8. The parking guidance device of claim 6, wherein the alarm unit is enabled to emit light for alerting.

9. The parking guidance device of claim 6, wherein the two-axis rotating detector is substantially a gyroscope.

10. The parking guidance device of claim 1, wherein the distance detector includes four sets of distance sensors while arranging two of the four sets at the right side of the car and the other two sets at the left side of the car.

11. The parking guidance device of claim 1, wherein the image detector includes two sets of image sensors to be arranged respectively at the left and the right sides of the car.

12. The parking guidance device of claim 1, wherein the central controller further comprises:
a main calculation unit, for controlling the image detector with regard to the performing of image processing, image identification, and data fusion upon the images acquired thereby, and for managing a car controller area network, for controlling a system flow of the parking guidance device, for controlling the processing of the human-machine operation interface, and the controlling of the signal outputting of the alarm unit; and
an auxiliary calculation unit, for controlling the operation of the distance detector and the processing of a vehicle signal.

13. A parking guidance method, comprising the steps of:
(a) providing a parking guidance device, being comprised of a central control, a distance detector, an image detector, a two-axis rotating detector, a human-machine operation interface, and a car controller area network bus interface, being electrically connected to the central control in respective;
(b) activating the parking guidance device for enabling the two-axis rotating detector to acquire information relating to the locality of a car;
(c) using an image detector to detect images from the two lateral sides of the car while using a distance detector to detect distances measured between obstacles located at the two lateral sides of the car;
(d) enabling a central controller to make an evaluation by the use of the obtained images for determining whether there is a parking space available for parking; if so, the flow proceeds to step (e); otherwise, the flow proceeds back to step (c);
(e) enabling the central controller to make an evaluation for determining whether the size of the available parking space is larger than that of the car; if so, the flow proceeds to step (f); otherwise, the flow proceeds to step (c);
(f) enabling the central controller to generate a relative position information between the car and the parking space according to the distances measured between obstacles surrounding the car and the locality information of the car;

(g) enabling the central controller to perform a calculation for gaining a parking track according to the relative position information; and
(h) enabling the central controller to direct the car to move in a moving track conforming to the parking track by controlling the wheel, engine and braking system through the car controller area network bus interface;
wherein the car length is $L_C$ the car width is $W_C$ the parking distance at the lateral side of a car is $\alpha$ which is a distance large enough for the car doors to open, the buffering distance at the lateral side of a car is $\beta$, the buffering distance relating to the length of the car is $\gamma$ and the length of a detected parking space is $L_X$ and the width thereof is $W_X$;
wherein if the detected length $L_X$ and the width $W_X$ satisfy the following conditions:
$L_C+\gamma \leq L_X$ and $W_C+\alpha+\beta \leq W_X \leq L_C+\gamma$, the parking guidance device determines that the detected parking space is suitable for parallel parking, as soon as the locality relationship information between the car and the parking space is obtained by its distance detector, the parking guidance device is able to perform a calculation according to the wheel's turning angle and the Ackerman theory to generate a parking trajectory for directing the car to perform a parallel parking operation; and
if the detected length $L_X$ and the width $W_X$ satisfy the following conditions:
$L_C+\gamma \leq W_X$ and $W_C+\alpha+\beta \leq L_X \leq L_C+\gamma$, the parking guidance device determines that the detected parking space is suitable for garage parking, as soon as the locality relationship information between the car and the parking space is obtained by its distance detector, the parking guidance device is able to perform a calculation according to the wheel's turning angle and the Ackerman theory to generate a parking trajectory for directing the car to perform a garage parking operation.

14. The parking guidance method of claim 13, wherein the parking guidance device further comprises:
a display unit, electrically connecting to the central controller.

15. The parking guidance method of claim 14, wherein the display unit is enabled to display the information relating to the distances between obstacles, the shape of the parking space and the locality of the car.

16. The parking guidance method of claim 14, wherein the display unit is enabled to display in a real time manner.

17. The parking guidance method of claim 13, wherein the parking guidance device further comprises:
a vehicle signal processing interface, electrically connecting to the central controller for detecting a signal relating to the movement of the car, a signal relating to the ignition of the car, a signal relating to the turn signal lamps of the car, a signal relating to the braking lamps of the car, a speed signal of the car, and a braking signal of the car.

18. The parking guidance method of claim 13, wherein the parking guidance device further comprises:
an alarm unit, electrically connecting to the central controller.

19. The parking guidance method of claim 18, wherein the alarm unit is enabled to issue a sound for alerting.

20. The parking guidance method of claim 18, wherein the alarm unit is enabled to emit light for alerting.

21. The parking guidance method of claim 13, wherein the two-axis rotating detector is substantially a gyroscope.

22. The parking guidance method of claim 13, wherein the distance detector includes four sets of distance sensors while arranging two of the four sets at the right side of the car and the other two sets at the left side of the car.

23. The parking guidance method of claim 13, wherein the image detector includes two sets of image sensors to be arranged respectively at the left and the right sides of the car.

24. The parking guidance method of claim 13, wherein the central controller further comprises:
   a main calculation unit, for controlling the image detector with regard to the performing of image processing, image identification, and data fusion upon the images acquired thereby, and for managing a car controller area network, for controlling a system flow of the parking guidance device, for controlling the processing of the human-machine operation interface, and the controlling of the signal outputting of the alarm unit; and
   an auxiliary calculation unit, for controlling the operation of the distance detector and the processing of a vehicle signal.

\* \* \* \* \*